(12) United States Patent
Gopalan et al.

(10) Patent No.: US 10,956,230 B2
(45) Date of Patent: Mar. 23, 2021

(54) WORKLOAD PLACEMENT WITH FORECAST

(71) Applicant: VMware, Inc., Palo Alto, CA (US)

(72) Inventors: Parikshit Santhana Gopalan Gopalan, Palo Alto, CA (US); Sandy Lau, Palo Alto, CA (US); Wei Li, Milpitas, CA (US); Leah Nutman, Sunnyvale, CA (US); Paul Pedersen, Palo Alto, CA (US); Yu Sun, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 122 days.

(21) Appl. No.: 16/147,974

(22) Filed: Oct. 1, 2018

(65) Prior Publication Data
US 2020/0104189 A1 Apr. 2, 2020

(51) Int. Cl.
*G06F 9/455* (2018.01)
*G06F 9/50* (2006.01)
(Continued)

(52) U.S. Cl.
CPC ............ *G06F 9/5088* (2013.01); *G06F 9/455* (2013.01); *G06F 9/4856* (2013.01); *G06F 9/5005* (2013.01); *G06F 9/505* (2013.01); *G06F 9/5016* (2013.01); *G06F 9/5027* (2013.01); *G06F 9/5061* (2013.01); *G06F 9/5077* (2013.01);
(Continued)

(58) Field of Classification Search
CPC .. G06F 9/5005; G06F 9/45558; G06F 9/4856; G06F 9/455; G06F 9/5077; G06F 11/34; G06F 9/5016; G06F 9/505; G06F 9/50; G06F 9/5094; G06F 9/5061; G06F 9/5088; G06F 9/5027; G06F 11/3457; G06F 11/3452; G06F 11/203; G06F 11/0793; G06F 11/3062; G06F 2209/5019; G06F 2209/5022
See application file for complete search history.

(56) References Cited

U.S. PATENT DOCUMENTS 6,813,897 B1 * 11/2004 Bash ..................... G06F 1/206
62/175
8,087,025 B1 * 12/2011 Graupner ............... G06F 9/505
718/104

(Continued)

OTHER PUBLICATIONS

Daniel Gmach et al., Workload Analysis and Demand Prediction of Enterprise Data Center Applications, IEEE 2007, [Retrieved on Oct. 23, 2020]. Retrieved from the internet: <URL: https://ieeexplore.ieee.org/stamp/stamp.jsp?arnumber=4362193> 10 Pages (171-180) (Year: 2007).*

(Continued)

*Primary Examiner* — Anibal Rivera
(74) *Attorney, Agent, or Firm* — Thomas | Horstemeyer LLP

(57) ABSTRACT

Various examples are disclosed for workload placement using forecast data. Forecast data for workloads and providers during a predefined period of time in the future is considered when identifying stressed providers and the feasibility of a workload move. Workloads with demand spikes at different future times can be matched by stacking current demand and forecast demand by timestamps. The possibility of stress can be reduced by making moves preemptively and considering forecast demand when evaluating the feasibility of a workload move.

20 Claims, 5 Drawing Sheets

(51) Int. Cl.
*G06F 9/46* (2006.01)
*G06F 9/48* (2006.01)

(52) U.S. Cl.
CPC ............... *G06F 2209/5019* (2013.01); *G06F 2209/5022* (2013.01)

(56) References Cited

U.S. PATENT DOCUMENTS

| | | | | |
|---|---|---|---|---|
| 8,095,929 | B1* | 1/2012 | Ji | G06F 9/4856 718/1 |
| 8,156,502 | B1* | 4/2012 | Blanding | G06F 9/50 718/104 |
| 8,175,863 | B1* | 5/2012 | Ostermeyer | G06F 11/3409 703/22 |
| 8,326,669 | B2* | 12/2012 | Korupolu | G06F 11/0793 705/7.22 |
| 8,683,479 | B1* | 3/2014 | Arlitt | G06F 9/5088 718/104 |
| 8,930,948 | B2* | 1/2015 | Shanmuganathan | G06F 9/5077 718/1 |
| 9,298,518 | B2* | 3/2016 | Novikov | G06F 9/5088 |
| 9,672,054 | B1* | 6/2017 | Gupta | G06F 9/45533 |
| 9,727,366 | B2* | 8/2017 | Dow | G06F 13/28 |
| 10,509,667 | B1* | 12/2019 | Popuri | G06F 9/45558 |
| 10,564,998 | B1* | 2/2020 | Gritter | G06F 9/5083 |
| 2006/0053251 | A1* | 3/2006 | Nicholson | G06F 3/0685 711/114 |
| 2008/0295096 | A1* | 11/2008 | Beaty | G06F 9/5077 718/1 |
| 2010/0115095 | A1* | 5/2010 | Zhu | H04L 67/12 709/226 |
| 2010/0180275 | A1* | 7/2010 | Neogi | G06F 1/3203 718/1 |
| 2010/0191854 | A1* | 7/2010 | Isci | G06F 1/3203 709/226 |
| 2011/0016214 | A1* | 1/2011 | Jackson | G06F 9/505 709/226 |
| 2011/0035072 | A1* | 2/2011 | Jackson | G06F 1/3203 700/291 |
| 2011/0173329 | A1* | 7/2011 | Zhang | G06F 1/3206 709/226 |
| 2011/0289333 | A1* | 11/2011 | Hoyer | G06F 9/505 713/323 |
| 2012/0054527 | A1* | 3/2012 | Pfeifer | G06F 11/203 713/340 |
| 2012/0109619 | A1* | 5/2012 | Gmach | G06Q 10/067 703/21 |
| 2012/0265881 | A1* | 10/2012 | Chen | G06F 9/5061 709/226 |
| 2013/0139152 | A1* | 5/2013 | Chang | G06F 9/45558 718/1 |
| 2013/0346969 | A1* | 12/2013 | Shanmuganathan | G06F 9/5016 718/1 |
| 2014/0059228 | A1* | 2/2014 | Parikh | H04L 67/42 709/226 |
| 2014/0082616 | A1* | 3/2014 | Kurita | H04L 49/70 718/1 |
| 2014/0278623 | A1* | 9/2014 | Martinez | G06Q 10/06 705/7.12 |
| 2014/0280961 | A1* | 9/2014 | Martinez | H04L 41/5054 709/226 |
| 2015/0039764 | A1* | 2/2015 | Beloglazov | H04L 47/70 709/226 |
| 2015/0278066 | A1* | 10/2015 | France | G06F 11/3452 709/224 |
| 2015/0341229 | A1* | 11/2015 | Richter | H04L 43/08 709/224 |
| 2016/0077741 | A1* | 3/2016 | Newby, Jr. | G06F 3/0647 711/165 |
| 2017/0160949 | A1* | 6/2017 | Greenfield | G06F 3/0653 |
| 2018/0101214 | A1* | 4/2018 | Mahindru | G06F 1/329 |
| 2018/0101215 | A1* | 4/2018 | Mahindru | G06F 1/3287 |
| 2018/0101216 | A1* | 4/2018 | Mahindru | G06F 1/3228 |
| 2018/0101220 | A1* | 4/2018 | Mahindru | G06F 1/3296 |
| 2018/0101415 | A1* | 4/2018 | Mahindru | G06F 11/3062 |
| 2018/0102953 | A1* | 4/2018 | Mahindru | G06F 9/5094 |
| 2018/0201676 | A1* | 7/2018 | Blaser | A61P 35/04 |
| 2018/0203614 | A1* | 7/2018 | Aronovich | G06F 3/0659 |
| 2018/0357110 | A1* | 12/2018 | Therien | G06F 1/3296 |
| 2019/0286475 | A1* | 9/2019 | Mani | G06F 9/4856 |
| 2019/0370085 | A1* | 12/2019 | Gross | H04L 47/762 |

OTHER PUBLICATIONS

Daniel Gmach et al., Capacity Management and Demand Prediction for Next Generation Data Centers, IEEE 2007, [Retrieved on Oct. 23, 2020]. Retrieved from the internet: <URL: https://ieeexplore.ieee.org/stamp/stamp.jsp?arnumber=4279581> 8 Pages (1-8) (Year: 2007).*

* cited by examiner

US 10,956,230 B2

WORKLOAD PLACEMENT WITH FORECAST

BACKGROUND

Network infrastructures can provide the hardware and software resources required for the operation and management of an enterprise. For example, a network infrastructure can include a hyper-converged infrastructure (HCI), a converged infrastructure, a hierarchical cluster engine (HCE) infrastructure, and/or any other type of infrastructure. An HCI, for example, can provide an enterprise with modular and expandable central processing unit (CPU), memory, storage, and network resources as well as system backup and recovery. In a hyper-converged infrastructure, CPU, memory, storage, and network resources are brought together using preconfigured and integrated hardware. Tasks can be allocated to hardware that is capable of performing the allotted task. When a task requires more resources, additional hardware can be assigned to the task, for example, using virtualization software.

Tasks, such as applications or virtual machines, can be allocated across a fleet of physical machines in a cluster of host machines by a resource scheduler. The resource scheduler can allocate and balance workloads across host machines that are aggregated into logical resource pools. Traditionally, resource schedulers can distribute workloads across hardware resources by balancing CPU, memory, storage, and network usage across a cluster of host machines.

Workload placement is a multi-dimensional problem which considers various resource dimensions (e.g., CPU, memory, storage, network, etc.) and different resource constraints to achieve overall optimization. Decisions often involve a large number of resources and need to be completed in a nominal amount of time (e.g., seconds). Current workload balance approaches tend to be reactive. Known approaches detect a problem in the environment and move workloads to rectify the problem. Workload migration can be a resource intensive operation. Further, without a consideration for future demand, a workload move that is determined to be optimal for a current time can still cause contention in the near-future, thus requiring a reallocation of the workload. Moving workloads constantly for optimal balance can exacerbate issues and cause unnecessary contention in the environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
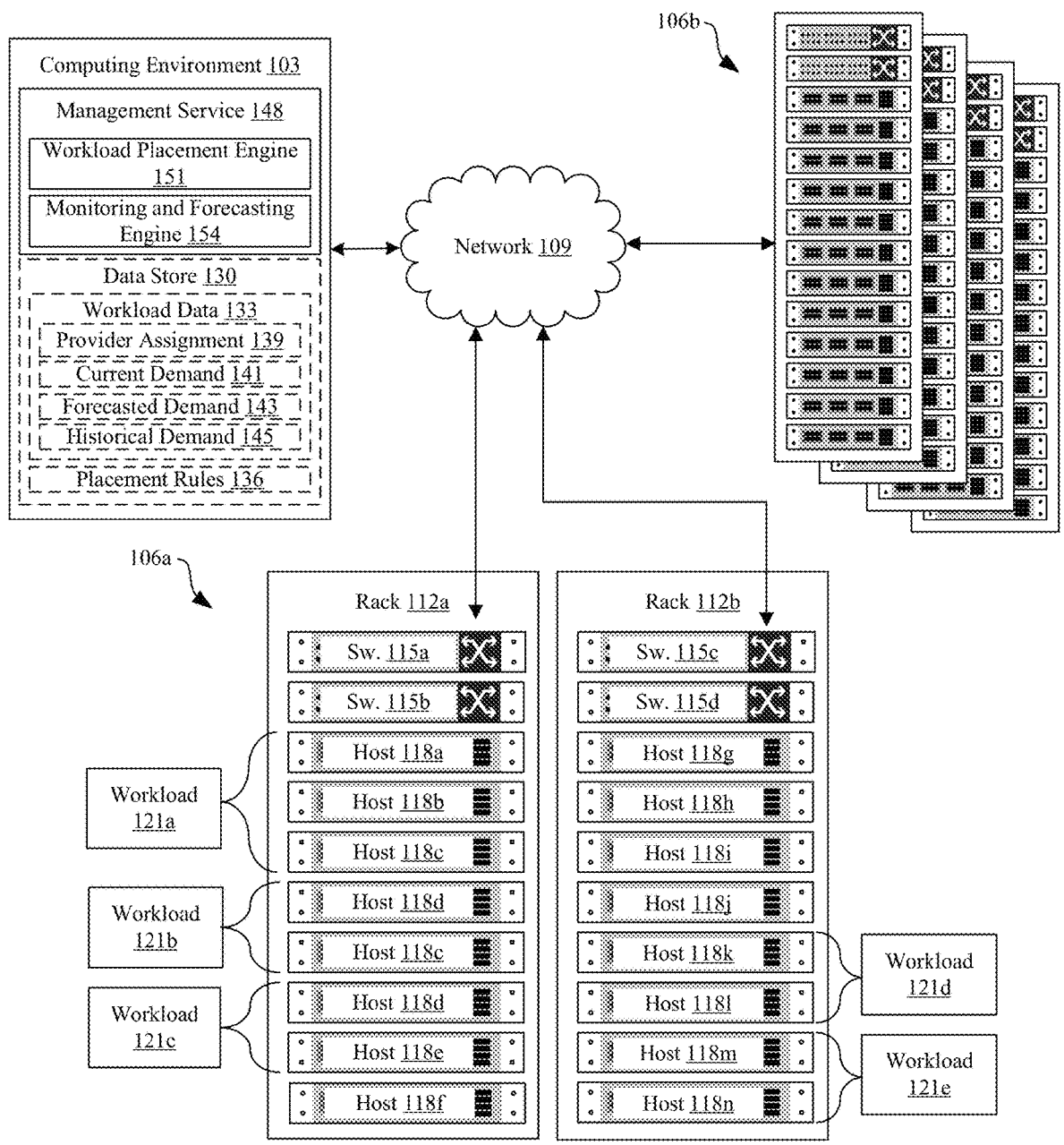
FIG. 1 is a drawing of an example of a network infrastructure including components connected through a network including a management service for determining placement of workloads.

The present disclosure relates to placement of workloads, such as virtual machines (VMs) or applications, within hyper-converged infrastructures and other infrastructures for providing CPU, memory, storage, and network resources that are brought together using integrated hardware. For example, in the case of virtual machines that are deployed within a hyper-converged infrastructure, workload placement across the physical resources of the infrastructure improves the scalability and efficiency of the data center in which the workloads are deployed.

Accordingly, various examples are described herein to achieve optimal workload placement while considering resource usage and resource constraints. In particular, example implementations examine the current state of the environment, understand past trends and patterns, and proactively move workloads to avoid contention in the HCI.

One example of this disclosure provides a workload placement framework using forecast data. Implementations of this framework consider the current demand and forecasted demand of resource providers (e.g., hosts, clusters, etc.) and workloads executing on the providers for determining placement decisions that minimize the possibility for a workload move within a predefined near-future period of time (e.g., one hour, two hours, four hours, etc.). Unlike known techniques which only consider current demand and/or a maximum value of the forecasted demand for providers and workloads, the implementations of the present disclosure consider fluctuations in demand that can occur over a range of time and match workloads having different resource usage spikes for near-future conditions (e.g., conditions within the predefined period of time).

For example, workloads from enterprise data centers typically display some patterned trends. The resource usage of workloads across various resource dimensions (e.g., CPU, memory, network, storage, etc.) within a virtual environment can be monitored. From the monitored data, trends in the resource usages for the individual workloads and the providers can be determined. The monitored data can be used to generate a forecast demand array of data values that represents an estimated fluctuation of demand during various time intervals during the predefined period of time for a particular workload. Similarly, a forecast demand array can be generated for a resource provider (e.g., host, cluster, etc.). For example, the provider forecast array can also represent a fluctuation of demand during the various time intervals during the predefined period of time according to the workloads currently residing on the resource provider.

To determine whether a target provider can support the resource usage of a particular workload during the predefined period of time, the current demand and forecast demand array of a workload can be stacked on top of the current demand and forecast demand array of the provider to generate an estimated effective demand for the target provider. For example, for each interval of time, the values of the current demand and forecast array of the demand can be added to the current demand and forecast array of the target provider. The estimated effective demand for the provider corresponds to the highest value of aggregate demand during the predetermined period of time. If the estimated effective demand for the target provider remains below a predefined capacity threshold, the workload can be moved to the target provider.

With reference to FIG. 1, an example of a network infrastructure 100 is shown. The network infrastructure 100 can include a computing environment 103 and various computing clusters 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. The network 109 can also include switches, routers, and other network devices. The network devices can include network devices that are held or integrated within racks and network devices that are external to the racks.

In various embodiments, the computing clusters 106 can include a plurality of devices installed in racks 112 (e.g., 112a, 112b) which can make up a server bank, aggregate computing system, or a computer bank in a data center or other like facility. The devices in the computing clusters 106 can include any number of physical machines, virtual machines, virtual appliances, and software, such as operating systems, drivers, hypervisors, scripts, and applications. The rack 112 can be a rack that is part of a hyper-converged infrastructure having CPU, memory, storage, and network resources that are provided using integrated and/or preconfigured hardware. In other cases, a rack can be part of a converged infrastructure or another type of infrastructure. The rack 112 can have a preconfigured number of switches, or a preconfigured number of slots for switches or other network devices. For example, the rack 112 can have switches 115 (e.g., 115a, 115b, 115c, 115d). The switches 115 can be top-of-rack switches or other integrated network devices of the rack 112. While not shown, the switches 115 can also be further connected to other switches and network devices including spine switches, End-of-Row switches, Middle-of-Row switches, or other switches, routers, and the like. The switches 115 can also be connected to routers, which can route traffic between racks or between sites. The rack 112 can also include a number of hosts, or a preconfigured number of slots or bays for hosts.

For example, the rack 112 can have hosts 118 (e.g., 118a-118n). Where the rack 112 is part of a hyper-converged infrastructure, each of the hosts 118 can provide CPU, memory, storage, and network resources. Each of the hosts 118, or host devices, can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The network devices can include network interface controllers or NICs switches, routers, and other network devices. The hosts can be utilized to perform or execute instructions, including processes, programs, applications, and other tasks that can be utilized in concert, for example, using software like the software defined datacenter (SDDC) manager, VMware vSphere®, vSAN®, NSX®, ESX®, ESXi®, and other virtualization software or tools.

The rack 112 can be part of a single site or as a part of a geographically disparate configuration of various racks 112. In some cases, one or more of the sites can be provided by a service that provides CPU, memory, storage, network, and other resources to an enterprise or another customer of the service. In other cases, one or more of the sites can also be owned or operated by the enterprise.

The various physical and virtual components of the computing clusters 106 can process workloads 121 (e.g., 121a . . . 121e). Workloads 121 can represent virtual machines or applications executed on hosts 118 within the HCI. Workloads 121 can be executed on a host device that runs a hypervisor that facilitates access to the physical resources of the host device by workloads 121 running atop the hypervisor. For example, VDI functionalities, IaaS functionalities, SaaS functionalities, IoT functionalities, VMware® Photon OS, AirWatch®, and other functionalities and application types can be provided by executing workloads 121 on hosts 118. Each workload 121 can have a host assignment that identifies which host 118 within the HCI on which the workload 121 is executed.

Software instructions can provide and assign resources using containers called workload domains. A workload domain can be a workload that is a physical collection of CPU, memory, storage, and network resources that provide uniform characteristics to applications and tasks such as security, data protection, performance, availability, and modular expandability. A workload domain can perform or execute tasks, including applications, programs, and other instructions. Workload domains can provide a virtual machine for a user, infrastructure as a service (IaaS), platform as a service (PaaS), desktop as a service (DaaS)/virtual desktop infrastructure (VDI), or other compute tasks. These can be considered workload domain types, and workload domain types can further include test and development workload domain types, production workload domain types, and other domain types that can include any of these services or a combination of these and other services.

Each domain type can be associated with a particular set of policies, settings, and capabilities for the workload domain. While an established workload domain can be assigned any desired task, workload domains can have a particular purpose or usage characteristics. In other words, there can be various types of workload domains. During the creation of workloads, the application or task requirements of the workload can be translated to physical infrastructure requirements including a number of hosts to assign to the workload, each having CPU, memory, storage, and network devices.

Referring now to the computing environment 103, the computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing clusters 106, it is understood that in some examples the computing environment 103 can be included as all or a part of the computing clusters 106.

The computing environment 103 can include or be operated as one or more virtualized computer instances in some examples. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing clusters 106 and client devices for end users over the network 109, sometimes remotely, the computing environment 103 can be described as a remote computing environment 103 in some examples. Additionally, in various examples, the computing environment 103 can be implemented in hosts 118 of a rack 112 and can manage operations of a virtualized or cloud computing environment. Hence, in some examples, the computing environment 103 can be referred to as a management cluster in the computing clusters 106.

The computing environment 103 can include a data store 130. The data store 130 can include memory of the computing environment 103, mass storage resources of the computing environment 103, or any other storage resources on which data can be stored by the computing environment 103. The data store 130 can include memory of the hosts 118 in some examples. For instance, the data store 130 can include one or more relational databases, such as structure query language (SQL) databases, non-SQL databases, or other relational or non-relational databases. The data stored in the data store 130, for example, can be associated with the operation of the various services or functional entities described below.

The data store 130 can include a database or other memory that includes, for example, workload data 133 and placement rules 136, as well as other data not discussed herein. The workload data 133 can include information pertaining to the various workloads executing on the hosts 118 within the HCI and/or other virtual environment. The workload data 133 can include provider assignment 139, current demand 141, forecasted demand 143, historical demand 145, and/or other data. The provider assignment 139 can include an identification of the host 118 and/or hosts 118 that a particular workload 121 is executed on within the HCI. In some examples, the HCI includes multiple clusters 106 of hosts 118. The provider assignment 139 can also include an identification of the cluster 106 that the particular workload 121 is executed on within the HCI.

The current demand 141 and the forecasted demand 143 can include the demand of the workload 121 across the different resource dimensions (e.g., CPU, memory, storage, network, etc.). For example, the current demand 141 can include data values associated with the current resource demand for the particular workload 121. The forecasted demand 143 can include an array of data values of predicted demand for a predefined period of time in the future. The forecasted demand data values can be determined according to historical data, machine learning models, and/or other data. The forecasted demand 143 can represent predicted fluctuations in demand that can occur over a range of time for near-future conditions.

The historical demand 145 can include resource usage history, data trends, and/or other information for a particular workload 121. For example, the resource usage history can include the amount of resources in each resource dimension used along with the date and time associated with the resource usage. The historical demand 145 can further include data trends associated with the workload 121 according to the resource usage history. For example, analysis of the monitored data as well as historical data can be used to determine that resource usage for a particular workload 121 is typically higher during the normal work hours (e.g., 8 am-5 pm) than non-work hours. In some examples, the data trends are determined according to machine learning models designed to accurately detect patterns in resource usage for a particular workload 121. The machine learning models can be trained according to the resource usage history of a one or more workloads 121.

The placement rules 136 can include rules and/or configuration data for the various algorithms or approaches employed by the workload placement engine 151 for selecting workload migration moves. For example, the placement rules 136 can include the configuration parameters associated with migrations that are based on forecasting. For example, the configuration parameters can include a predefined near-future period of time associated with workload migration with forecasting. In some examples, this predefined near-future period of time can correspond to a period of time selected by an administrator. The placement rules 136 can further include the provider capacity thresholds for each of the different hosts 118 and/or clusters 106.

The components executed on the computing environment 103 can include, for example, a management service 148 as well as other applications, services, processes, systems, engines, or functionality not discussed in detail herein. The management service 148 can oversee the operation of the network infrastructure 100 through management of the computing clusters 106 as well as the physical and virtual computing resources that make up the computing clusters 106. In some examples, an enterprise, organization, or other entity can operate the management service 148 to oversee or manage the operation of devices in the racks 112, such as hosts 118, switches 115, power supplies, cooling systems, and other components.

Additionally, in some examples, the management service 148 can include a workload placement engine 151 and a monitoring and forecasting engine 154. The workload placement engine 151 can determine workload migration moves according to various implementations. For example, the workload placement engine 151 can move workloads 121 to hosts 118 according to near-future forecasting.

The monitoring and forecasting engine 154 can monitor and analyze the resource usage across all resource dimensions for all workloads, workload domains, applications, and tasks across individual sites or multiple sites, including local hardware, private cloud, public cloud, and hybrid cloud deployments. In some examples, the monitoring and forecasting engine 154 can calculate the current demand 141 and the forecasted demand 143 associated with each workload 121 and/or provider 202. The forecasted demand data values can be determined according to historical data, machine learning models, and/or other data.

In some implementations, the monitoring and forecasting engine 154 can periodically analyze the historical demand 145 to calculate the current demand 141 and the forecasted demand 143. In other implementations, the monitoring and forecasting engine 154 can calculate the current demand 141 and/or the forecasted demand 143 according to historical demand 145 at a predefined time. The monitoring and forecasting engine 154 can further update the past trend models that can be used to predict resource demand using machine learning techniques using the historical demand 145.

Figure 2:
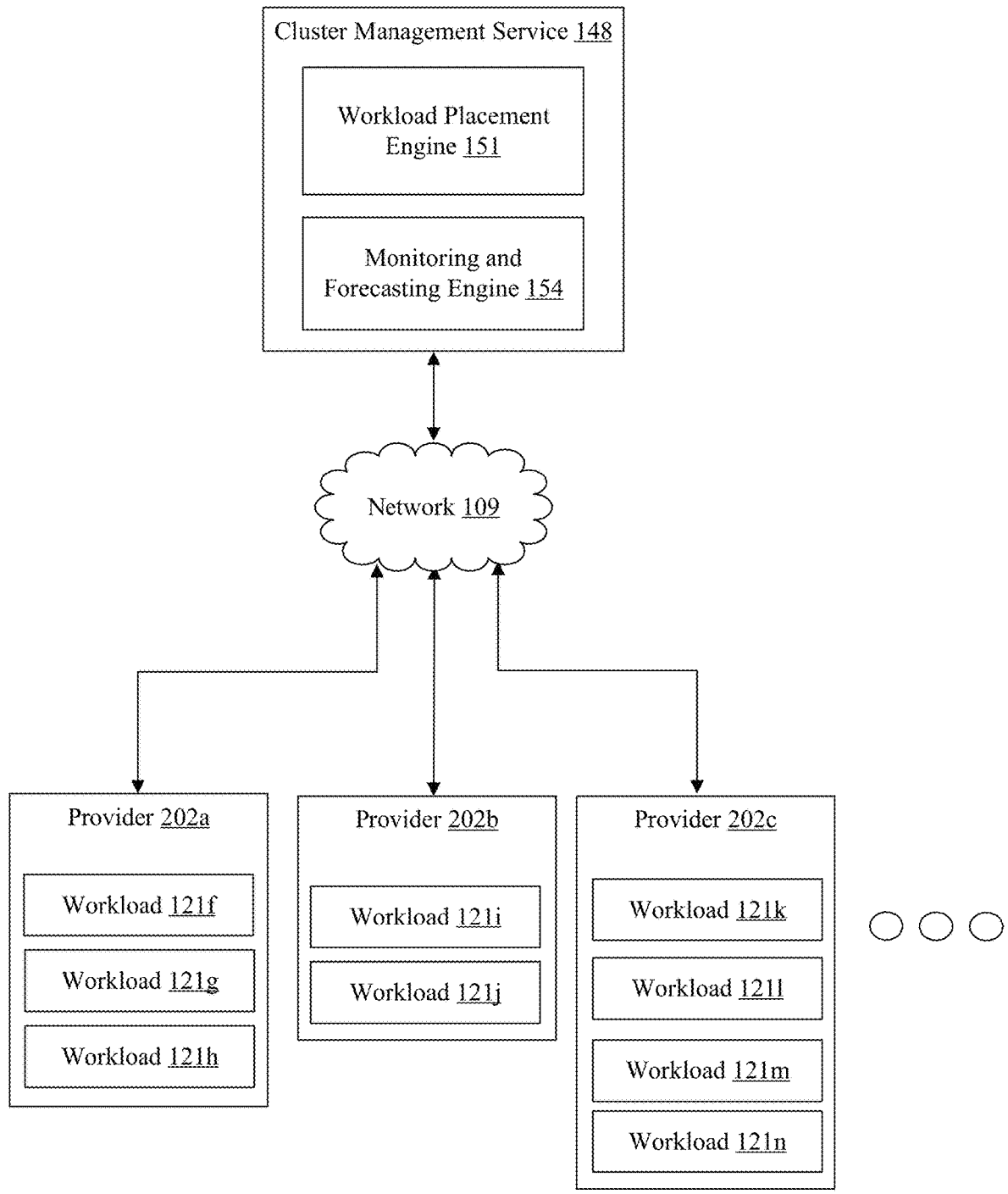
FIG. 2 is a drawing of another example of the network environment showing components of the network environment including the management service for determining placement of workloads.

Referring to FIG. 2, shown is an example of select components of the network infrastructure 100 in communication through the network 109. As discussed, the management service 148 can oversee the operation of the network infrastructure 100 through management of the computing clusters 106 as well as the physical and virtual computing resources that make up the computing clusters 106. In FIG. 2, workloads 121 (121f . . . 121n) are shown residing on different providers 202 (e.g., 202a, 202b, 202c) within the virtual environment. The provider 202 can refer to a host 118 in a particular cluster 106 and/or a cluster of hosts 118. According to various implementations, the management service 148 can monitor workload usage as well as availability and capacity of a provider 202 to determine whether a workload 121 should be moved to another host 118 for load balancing or consolidation. In one example, the workloads 121 can be migrated between different hosts 118 in the same cluster 106. In another example, the workloads 121 can be migrated to a host 118 in a different cluster 106 in a defined datacenter.

In some examples, the workload placement engine 151 can use forecasting as a factor in workload placement. For example, the workload placement engine 151 can consider the fluctuations in demand over a near-future period of time to match workloads 121 on providers 202 that are predicted to exhibit resource usage spikes at different times.

While capacity usually can typically remain constant, resource demand by workloads 121 can fluctuate. In various implementations, near-future contention among workloads 121 can be minimized by factoring forecast in a demand calculation for workload migration. The current demand 141 and the forecasted demand 143 for workloads 121 and providers 202 can be determined according to the current state of the environment, historical demand 145, past trend patterns defined using machine learning models developed using the historical demand 145, and/or other data. The current demand 141 and forecasted demand 143 for each workload 121 and provider 202 can include a current demand value and forecasted demand values. The current demand 141 can include data values associated with the current resource demand for the particular workload 121. The forecasted demand 143 can include an array of data values of predicted demand over different time intervals over a predefined future period of time.

In some implementations, the current demand 141 and forecasted demand 143 can be re-calculated periodically (e.g., hourly, daily, every ten minutes, etc.), and/or at a set period of time. For example, the monitoring and forecasting engine 154 can monitor and analyze the resource usages for a particular workload 121 and/or provider 202 at a particular instance to determine the current and forecasted demand.

Effective demand can be determined for both the resource provider 202 and a workload 121. Effective demand is the maximum of a current demand value and each data point in a forecast array over a predefined period of time in the future. The effective demand for a provider 202 can be used to determine whether the provider 202 is under stress with a near and/or overcapacity demand. For example, the effective demand for a provider 202 can be compared to a provider capacity threshold. If the effective demand for the provider 202 exceeds the provider capacity threshold, the provider 202 can be determined to be under stress.

Further, the effective demand for a workload 121 can be used to identify a resource hogging workload 121 within a provider 202. For example, the effective demand of a workload 121 can be compared to a workload usage threshold to determine whether the workload 121 is using an excessive amount of resources of the provider 202 given the capacity capabilities of the provider 202. If the effective demand of the workload exceeds the workload usage threshold, the workload 121 can be determined to be a resource hogging workload 121. In one example, the workload usage threshold can be based on a predefined configuration parameter that is specified by an administrator. In another example, the workload usage threshold can be based on a percentage and/or a ratio of resources used by the workload 121.

Additionally, effective demand can be used to identify a target provider 202 who may have available capacity to accept the load associated with the resource hogging workload 121. For example, if the effective demand of a target provider 202 is below a predefined capacity threshold, the target provider 202 can be considered as a potential provider 202 to which the resource hogging workload 121 can be moved.

To determine whether a target provider 202 can support the resource usage of a particular workload 121 during the predefined period of time, the current demand and forecast demand array of a workload 121 can be stacked on top of the current demand and forecast array of the provider to generate an estimated effective demand. By adding the values of the current demand and forecast demand array of the workload 121 with the current demand and forecast demand array of a target provider 202, the estimated effective demand for the target provider 202 can be determined. The estimated effective demand corresponds to the maximum value associated with the aggregate demand. If the estimated effective demand for the target provider 202 remains below a provider capacity threshold, the workload 121 can be moved to the target provider 202.

For example, if a workload 121 is predicted to have a usage spike during a first time interval and the target provider 202 is predicted to have a usage spike during a second time interval, the resource usage for the provider 202 may still be able to support workload 121 since the usage spikes occur at different times. If the usage spike for the workload 121 occurs during a time where the provider 202 is under stress and/or other workloads 121 residing in the provider are peaking in resource usages, the effective demand will likely exceed the provider capacity threshold, and migration of the workload 121 to the target provider 202 may not be feasible.

Figure 3A:
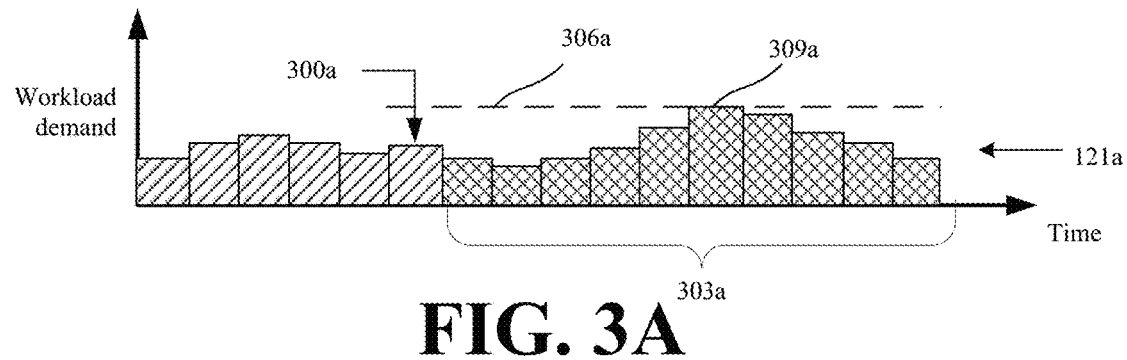
FIGS. 3A-3C are graphical representations of the workload and provider demand over a predetermined period of time.
Figure 3B:
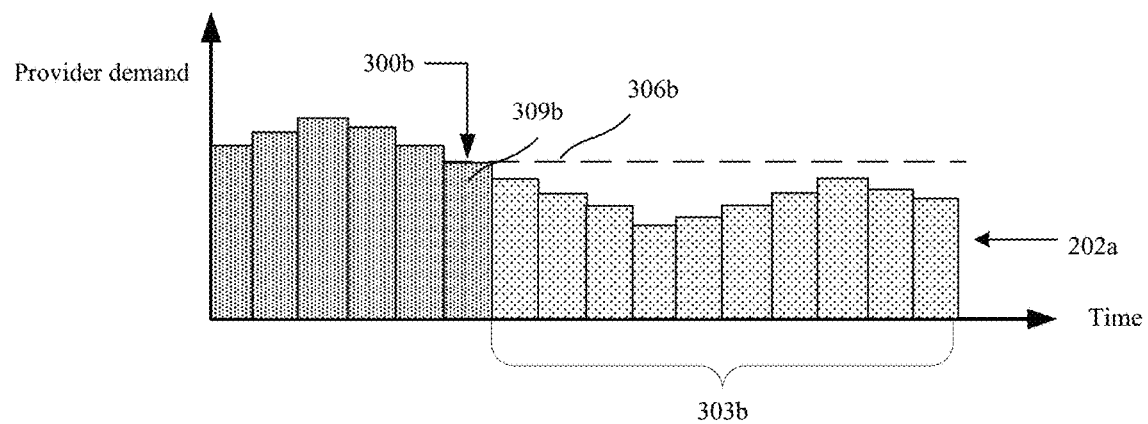
Figure 3C:
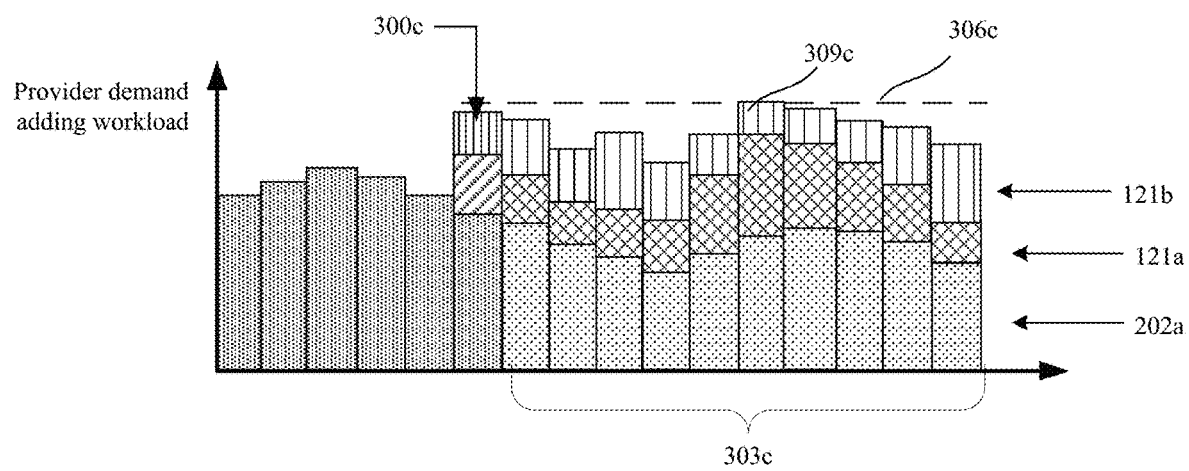

Referring to FIGS. 3A-3C, shown are examples of graphical representations of the current demand 141 and the forecasted demand 143 for a workload 121a and a target provider 202b over a period of time. FIG. 3A illustrates an example of the current demand 300a and forecasted demand 303a for a particular workload 121a. In particular, FIG. 3A illustrates the fluctuation in data values representing the past, current, and predicted resource usage demand for the workload 121a. As shown, in FIG. 3A, the effective demand 306a for the particular workload 121a is based on the maximum value 309 in the current demand 300a and forecasted demand 303a.

FIG. 3B illustrates an example of the current demand 300b and forecasted demand 303b for a particular provider 202b. In particular, FIG. 3B illustrates the fluctuation in data values representing the past, current, and predicted resource usage demand for the provider 202b. As shown, in FIG. 3B, the effective demand 306b for the particular provider 202b is based on the maximum value 309b in the current demand 300b and forecasted demand 303b for the provider 202b. In this instance, the maximum value 309b corresponds to the current demand 300b. The provider current demand 141 and the provider forecasted demand 143 is calculated according to demand for the different workloads 121 currently residing on the provider 202 at the time of calculation.

FIG. 3C illustrates an example of the current demand 300 and forecasted demand 303 of the workloads 121a and 121b stacked on the current demand 300b and forecasted demand 303b of the provider 202b. As shown in FIG. 3C, workload 121a and workload 121b each exhibit varying fluctuations in resource usage over the future period of time. According to various implementations, the current demand 300 and forecasted demand 303 for workload 121a and workload 121b can be stacked on top of the current demand 300b and forecasted demand 303b of the provider 202b to create an aggregate current demand 300c and aggregate forecasted demand 303c. The estimated effective demand 306c corresponding to this potential move is based on the maximum value 309c in the aggregate current demand 300c and aggregate forecasted demand 303c, instead of the aggregate of maximum values 309 for workload 121a, workload 121b, and provider 202a. The estimated effective demand 306c can be compared to the available capacity (e.g., provider capacity threshold) of the provider 202a to determine whether the provider 202a can support the load of the additional workloads 121a, 121b. If two workloads 121 have a forecasted workload peak that combined would exceed the capacity of the provider, but occur at different times, the workloads 121 may still be able to reside in the same provider 202a.

Figure 4:
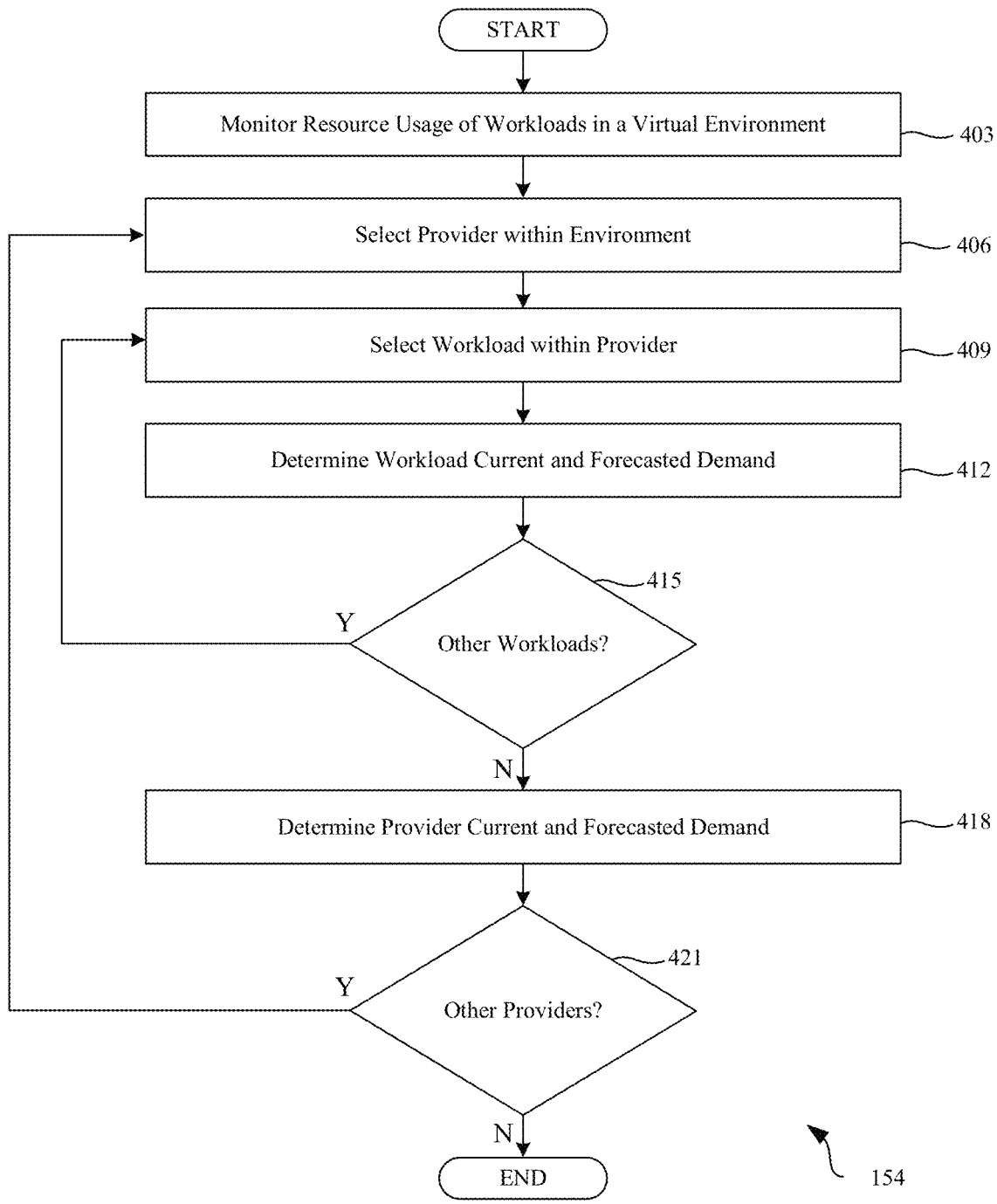
FIGS. 4 and 5 are flowcharts that illustrate functionality implemented by components of the network environment of FIG. 1.

Moving on to FIG. 4, shown is a flowchart that provides one example of the operation of a portion of the network infrastructure 100. The flowchart of FIG. 4 can be viewed as depicting an example of elements of a method implemented by the monitoring and forecasting engine 154 executing in the computing environment 103 according to one or more examples. The separation or segmentation of functionality as discussed herein is presented for illustrative purposes only. FIG. 4 provides an example of functionality that can be performed to determine the current demand 141 and the forecasted demand 143 for both workloads 121 and providers 202.

Beginning with step 403, the monitoring and forecasting engine 154 can monitor the resource usage across all resource dimensions for all workloads 121 across individual sites or multiple sites in the virtual environment. The monitoring and forecasting engine 154 can monitor the resource usage across each resource dimension (e.g., CPU, memory, storage, network, etc.) and update the historical demand 145 for each particular workload 121 according to the monitored historical demand 145. The monitoring and forecasting engine 154 can monitor each workload 121 periodically, randomly, or at a predefined time. For example, the monitoring and forecasting engine 154 can monitor each workload every two hours. In an alternative example, the monitoring and forecasting engine 154 can randomly monitor each workload 121 such that monitoring of the workloads 121 is not based on a periodic and/or predefined time.

At step 406, the monitoring and forecasting engine 154 can select a provider 202 within the virtual environment. In some examples, the provider 202 corresponds to a host 118 within a particular cluster 106. In some examples, the provider 202 corresponds to a particular cluster 106 of multiple clusters 106 within a virtual environment. In some examples, the provider 202 can be selected randomly. In other examples, the provider 202 can be selected according to a provider identifier, an available capacity, and/or any other factor.

At step 409, the monitoring and forecasting engine 154 can select a workload 121 within the provider 202. The workload 121 can be selected according to a workload identifier, according to resource usage, randomly, and/or any other factor as can be appreciated. For example, the monitoring and forecasting engine 154 can select the workload 121 having the highest demand of resources. In an alternative example, the monitoring and forecasting engine 154 can randomly select a workload 121 within the provider 202.

At step 412, the monitoring and forecasting engine 154 can determine the current demand 141 and the forecasted demand 143 for the workload 121. The current demand 141 includes a current demand value of the workload 121. The forecasted demand 143 includes a forecast demand array of values for time intervals over a predefined period of time in the future. The current demand 141, 300 can be based on the current resource usage in the resource dimensions by the workload 121. The forecasted demand 143, 303 corresponds to predicted data values according to historical demand 145 and trend models.

At step 415, the monitoring and forecasting engine 154 can determine if there are other workloads 121 residing in the selected provider 202 that have not yet determined the current demand 141 and forecasted demand 143. If there are additional workloads 121, the monitoring and forecasting engine 154 returns to step 409. Otherwise, the monitoring and forecasting engine 154 proceeds to step 418.

At step 418, the monitoring and forecasting engine 154 can determine current demand 141 and forecasted demand 143 for the selected provider 202. The provider current demand 141 includes the current demand 300 of all of the workloads 121 residing on the provider 202. The provider forecasted demand 143 includes a forecasted demand 303 of all of the workloads 121 residing on the provider 202 for the predefined period of time.

At step 421, the monitoring and forecasting engine 154 can determine if there are other providers 202 in the virtual environment. If there are additional providers 202, the monitoring and forecasting engine 154 returns to step 406. Otherwise, the process can proceed to completion.

Figure 5:
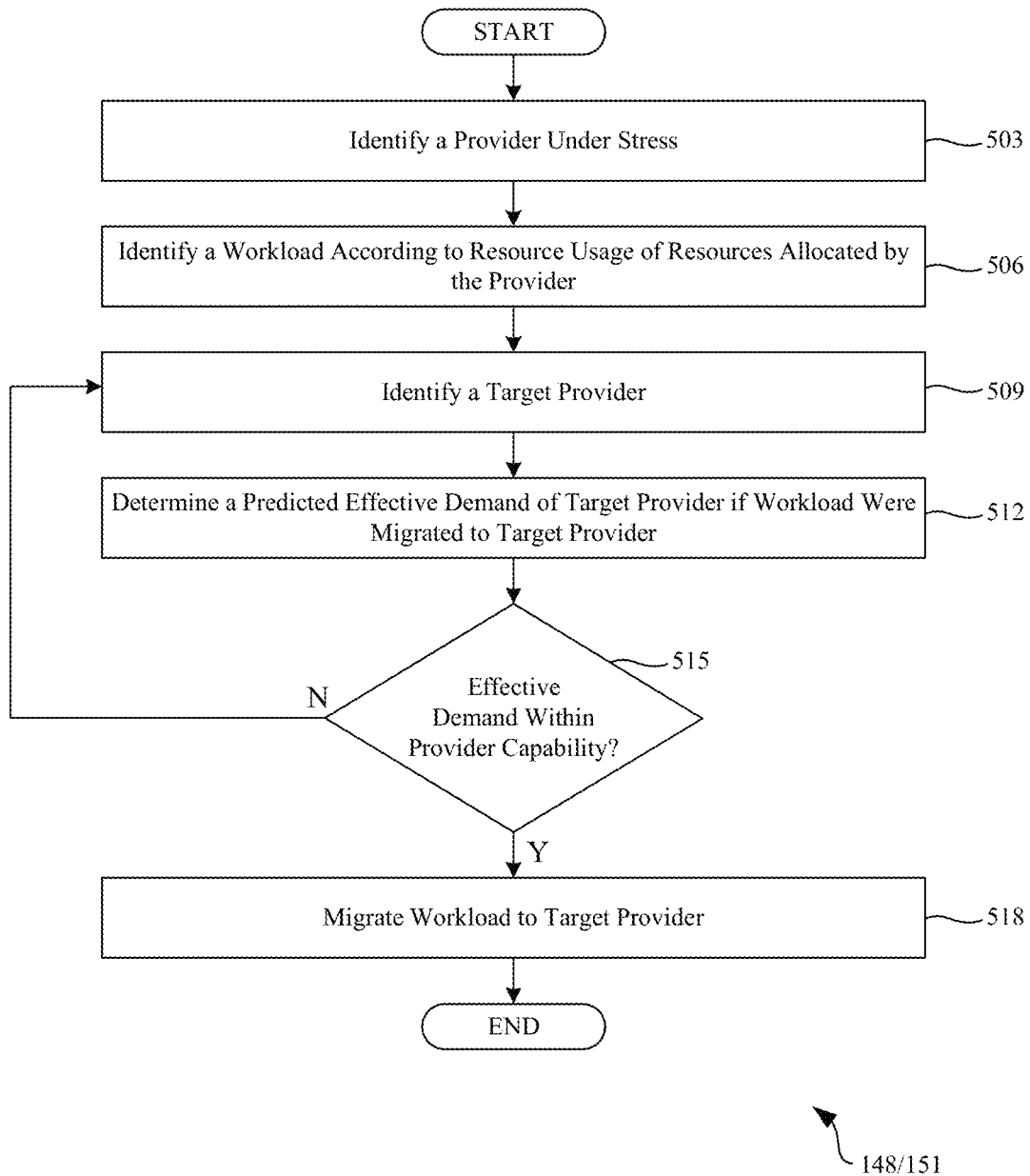

Referring next on to FIG. 5, shown is a flowchart that provides one example of the operation of a portion of the network infrastructure 100. The flowchart of FIG. 5 can be viewed as depicting an example of elements of a method implemented by the management service 148 or workload placement engine 151 executing in the computing environment 103 according to one or more examples. The separation or segmentation of functionality as discussed herein is presented for illustrative purposes only.

FIG. 5 provides an example of functionality that can be performed to determine workload placement using forecasting. In particular, the current demand 300 and forecasted demand 303 of workloads 121 and target providers 202 can be considered in determining whether a provider 202 can support the load of a particular workload 121 during a near-future period of time.

Beginning with step 503, the workload placement engine 151 can identify a provider 202 under stress according to the effective demand 306 of the provider 202. The effective demand 306 for the provider 202 is based at least in part on the maximum value 309 of the current demand 141, 300 and the forecasted demand 143, 303 of the provider 202 over a predefined future period of time. If the effective demand 306 for the provider 202 exceeds the provider capacity threshold, the provider 202 can be determined to be under stress.

At step 506, the workload placement engine 151 can identify a workload 121 residing in the provider 202 according to resource usage of resources being allocated by the provider 202. For example, the workload 121 can correspond to a workload 121 that is monopolizing the resources of the provider 202. The resource usage of the workload can be determined according to an effective demand 306 of the workload 121. The effective demand 306 for the workload 121 is based at least in part on the maximum value 309 of the current demand 141, 300 and the forecasted demand 143, 303 for the workload 121. For example, the identified workload 121 can correspond to the workload 121 with the highest effective demand. Alternatively, the effective demand 306 of the workload 121 can be compared to a workload usage threshold to determine whether the workload 121 is hogging the resources of the provider 202 given the capacity capabilities of the provider 202. If the effective demand 306 of the workload 121 exceeds the workload usage threshold, the workload 121 can be determined to be monopolizing the resources of the provider 202.

At step 509, the workload placement engine 151 can identify a target provider 202. The target provider 202 can be identified according to the available capacity of the provider 202 to accept another workload load. The target provider 202 can be identified according to the effective demand 306 of the target provider 202. If the effective demand 306 of the target provider 202 is below a provider capacity threshold, the target provider 202 can be considered as a potential provider 202 to which the resource hogging workload 121 can be moved.

At step 512, the workload placement engine 151 determines an estimated effective demand 306 of the target provider 202 if the workload 121 were to be migrated to the target provider 202. The effective demand 306 can be estimated by stacking the current demand 300 and forecasted demand 303 of the workload 121 on top of the current demand 300 and forecasted demand 303 of the target provider 202. In one example, the current demand values and the values in the forecast demand array of the workload 121 are added to the current demand values and the values in the forecast demand array of the provider 202 for each of the different time intervals over the predefined period of time. The effective demand 306 is the maximum value 309 of the aggregated values. For example, if the total demand value during time interval c is greater than all of the other total demand values for the current time and the remaining time intervals during the predefined period of time, the effective demand 306 will be the value associated with time interval c.

At step 515, the workload placement engine 151 compares the estimated effective demand 306 with the provider capacity threshold of the provider 202. If the estimated effective demand 306 is within the provider capacity threshold, the workload placement engine 151 proceeds to step 518. Otherwise, the workload placement engine 151 returns to step 509 to identify another potential target provider 202.

At step 518, the workload placement engine 151 or the management service 148 migrates the workload 121 to the target provider 202. Thereafter, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the management service 148. These client devices can include a display upon which a user interface generated by a client application for providing a virtual desktop session (or other session) can be rendered. In some examples, the user interface can be generated using user interface data provided by the computing environment 103. The client device can also include one or more input/output devices that can include, for example, a capacitive touchscreen or other type of touch input device, fingerprint reader, or keyboard.

Although the management service 148 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for workload placement, comprising:
   at least one computing device comprising a processor and memory;
   at least one application executable by the at least one computing device, wherein, when executed, the at least one application causes the at least one computing device to at least:
      determine that a first provider is operating under stress according to a first provider capacity threshold;
      identify a workload residing in the first provider according to a resource usage of at least one resource being allocated to the workload by the first provider, wherein the workload is identified by selecting the workload with a highest effective demand and the workload that exceeds a workload usage threshold;
      identify a second provider that is operating below capacity according to a second provider capacity threshold;
      determine an estimated demand for the second provider if the workload were to be migrated to the second provider based at least in part on an aggregate current demand and an aggregate forecasted demand, the aggregate current demand representing a current workload demand of the workload and a current provider demand of the second provider, the aggregate forecasted demand comprising a forecasted workload demand of the workload and a forecasted provider demand of the second provider, and the aggregate forecasted demand comprising an array of aggregate forecasted demand values over a predefined future period of time;
      determine an estimated effective demand for the second provider according to a maximum demand value, the maximum demand value comprising a maximum value of the estimated demand between a current time and the predefined future period of time; and
      migrate the workload from the first provider to the second provider in an instance in which the estimated effective demand is below the second provider capacity threshold.

2. The system of claim 1, wherein the workload is a particular workload of a plurality of workloads residing on the first provider, and when executed, the at least one application further causes the at least one computing device to at least:
   monitor resource usage of individual workloads of the plurality of workloads.

3. The system of claim 2, wherein when executed, the at least one application further causes the at least one computing device to at least:
   generate a respective workload demand for the individual workloads based at least in part on the monitored resource usage, the respective workload demand comprising a respective current demand and a respective forecasted demand array, and the respective forecasted demand array comprising an array of forecasted demand values for a respective workload over the predefined future period of time.

4. The system of claim 3, wherein when executed, the at least one application further causes the at least one computing device to at least:
   generate a provider demand for the first provider, the provider demand being based at least in part on an aggregate of the respective workload demand for each of the individual workloads of the plurality of workloads.

5. The system of claim 1, wherein when executed, the at least one application further cause the at least one computing device to at least:
   compare a first provider effective demand to the first provider capacity threshold, wherein the first provider is determined to be under stress in an instance in which the first provider effective demand meets or exceeds the first provider capacity threshold.

6. The system of claim 1, wherein the first provider and the second provider comprise at least one of: a host or a cluster of hosts.

7. The system of claim 1, wherein the at least one resource allocated to the workload by the first provider comprises at least one of: a central processing unit (CPU) or an amount of memory.

8. A non-transitory computer-readable medium embodying executable instructions, which, when executed by a processor, cause at least one computing device to at least:
   determine that a first provider is operating under stress according to a first provider capacity threshold;
   identify a workload residing in the first provider according to a resource usage of at least one resource being allocated to the workload by the first provider, wherein the workload is identified by selecting the workload with a highest effective demand and the workload that exceeds a workload usage threshold;

identify a second provider that is operating below capacity according to a second provider capacity threshold;

determine an estimated demand for the second provider if the workload were to be migrated to the second provider based at least in part on an aggregate current demand and an aggregate forecasted demand, the aggregate current demand representing a current workload demand of the workload and a current provider demand of the second provider, the aggregate forecasted demand comprising a forecasted workload demand of the workload and a forecasted provider demand of the second provider, and the aggregate forecasted demand comprising an array of aggregate forecasted demand values over a predefined future period of time;

determine an estimated effective demand for the second provider according to a maximum demand value, the maximum demand value comprising a maximum value of the estimated demand between a current time and the predefined future period of time; and migrate the workload from the first provider to the second provider in an instance in which the estimated effective demand is below the second provider capacity threshold.

9. The non-transitory computer-readable medium of claim 8, wherein the workload is a particular workload of a plurality of workloads residing on the first provider, and when executed, the executable instructions further cause the at least one computing device to at least:

monitor resource usage of individual workloads of the plurality of workloads.

10. The non-transitory computer-readable medium of claim 9, wherein when executed, the executable instructions further cause the at least one computing device to at least:

generate a respective workload demand for the individual workloads based at least in part on the monitored resource usage, the respective workload demand comprising a respective current demand and a respective forecasted demand array, and the respective forecasted demand array comprising an array of forecasted demand values for a respective workload over the predefined future period of time.

11. The non-transitory computer-readable medium of claim 10, wherein when executed, the executable instructions further cause the at least one computing device to at least:

generate a provider demand for the first provider, the provider demand being based at least in part on an aggregate of the respective workload demand for each of the individual workloads of the plurality of workloads.

12. The non-transitory computer-readable medium of claim 8, when executed, the executable instructions further cause the at least one computing device to at least:

compare a first provider effective demand to the first provider capacity threshold, wherein the first provider is determined to be under stress in an instance in which the first provider effective demand meets or exceeds the first provider capacity threshold.

13. The non-transitory computer-readable medium of claim 8, wherein the at least one resource allocated to the workload by the first provider comprises at least one of: a central processing unit (CPU) or an amount of memory.

14. A computer-implemented method, comprising:

determining that a first provider is operating under stress according to a first provider capacity threshold;

identifying a workload residing in the first provider according to a resource usage of at least one resource being allocated to the workload by the first provider, wherein the workload is identified by selecting the workload with a highest effective demand and the workload that exceeds a workload usage threshold;

identifying a second provider that is operating below capacity according to a second provider capacity threshold;

determining an estimated demand for the second provider if the workload were to be migrated to the second provider based at least in part on an aggregate current demand and an aggregate forecasted demand, the aggregate current demand representing a current workload demand of the workload and a current provider demand of the second provider, the aggregate forecasted demand comprising a forecasted workload demand of the workload and a forecasted provider demand of the second provider, and the aggregate forecasted demand comprising an array of aggregate forecasted demand values over a predefined future period of time;

determining an estimated effective demand for the second provider according to a maximum demand value, the maximum demand value comprising a maximum value of the estimated demand between a current time and the predefined future period of time; and migrating the workload from the first provider to the second provider in an instance in which the estimated effective demand is below the second provider capacity threshold.

15. The computer-implemented method of claim 14, wherein the workload is a particular workload of a plurality of workloads residing on the first provider, and further comprising:

monitoring resource usage of individual workloads of the plurality of workloads.

16. The computer-implemented method of claim 15, further comprising:

generating a respective workload demand for the individual workloads based at least in part on the monitored resource usage, the respective workload demand comprising a respective current demand and a respective forecasted demand array, and the respective forecasted demand array comprising an array of forecasted demand values for a respective workload over the predefined future period of time.

17. The computer-implemented method of claim 16, further comprising:

generating a provider demand for the first provider, the provider demand being based at least in part on an aggregate of the respective workload demand for each of the individual workloads of the plurality of workloads.

18. The computer-implemented method of claim 14, further comprising:

comparing a first provider effective demand to the first provider capacity threshold, wherein the first provider is determined to be under stress in an instance in which the first provider effective demand meets or exceeds the first provider capacity threshold.

19. The computer-implemented method of claim 14, wherein the first provider and the second provider comprise at least one of: a host or a cluster of hosts.

20. The computer-implemented method of claim 14, wherein the at least one resource allocated to the workload by the first provider comprises at least one of: a central processing unit (CPU) or an amount of memory.

\* \* \* \* \*